US008073998B2

(12) United States Patent
Ohnuma et al.

(10) Patent No.: US 8,073,998 B2
(45) Date of Patent: Dec. 6, 2011

(54) DISPLAY SYSTEM AND DISPLAY APPARATUS

(75) Inventors: Atsushi Ohnuma, Osaka (JP); Tatsuya Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 12/602,601

(22) PCT Filed: Jul. 7, 2008

(86) PCT No.: PCT/JP2008/062276
§ 371 (c)(1),
(2), (4) Date: Dec. 1, 2009

(87) PCT Pub. No.: WO2009/008404
PCT Pub. Date: Jan. 15, 2009

(65) Prior Publication Data
US 2010/0177245 A1    Jul. 15, 2010

(30) Foreign Application Priority Data

Jul. 10, 2007  (JP) .................................. 2007-181181

(51) Int. Cl.
*G06F 13/12* (2006.01)
*G06F 13/00* (2006.01)
(52) U.S. Cl. ......................................... 710/62; 348/725
(58) Field of Classification Search .................... 710/63, 710/16, 4–5; 348/558, 725–734
See application file for complete search history.

(56) References Cited

U.S. PATENT DOCUMENTS

| 7,822,879 B2 * | 10/2010 | Lida et al. .......................... 710/3 |
| 7,827,319 B2 * | 11/2010 | Kimura et al. ..................... 710/5 |
| 2003/0223377 A1 | 12/2003 | Simmons et al. |
| 2008/0170164 A1 * | 7/2008 | Park .............................. 348/734 |
| 2008/0172504 A1 * | 7/2008 | Kimura et al. ................... 710/63 |
| 2008/0297371 A1 * | 12/2008 | Ida ............................ 340/825.52 |
| 2009/0049205 A1 * | 2/2009 | Park ................................. 710/4 |
| 2009/0059072 A1 * | 3/2009 | Tomita ........................... 348/554 |

(Continued)

FOREIGN PATENT DOCUMENTS

EP    2 048 883 A1    4/2009

(Continued)

OTHER PUBLICATIONS

High-Definition Multimedia Interface Specification Version 1.3a, Hitachi, Ltd., etc., pp. CEC-18-CEC-45, Nov. 10, 2006.

(Continued)

*Primary Examiner* — Kindred Alford
(74) *Attorney, Agent, or Firm* — Birch, Stewart, Kolasch & Birch, LLP

(57) ABSTRACT

If a device non-compatible with CEC is contained in an input path when a display apparatus is HDMI-connected hierarchically to a plurality of external devices, an external device which has transmitted <Active Source> is selected as an operation object device. A TV (100) is HDMI-connected hierarchically to external devices (an AV amplifier (20a), recorders (10a, 10c), a DVD player (10b)) in a tree shape. The TV (100) receives <Active Source> indicating an active state capable of video output from the DVD player (10b) and transmits <Set Stream Path> for switching the input path to the DVD player (10b). When a device non-compatible with CEC (AV amplifier (20a)) is contained in the input path which transmits <Set Stream Path>, the TV (100) selects the DVD player (10b) specified <Active Source> as an operation object device.

5 Claims, 4 Drawing Sheets

U.S. PATENT DOCUMENTS

2009/0157885 A1    6/2009  Takatsuji et al.
2009/0284656 A1*  11/2009  Suzuki et al. ................. 348/554
2010/0118194 A1*   5/2010  Kimura ......................... 348/558
2010/0157154 A1*   6/2010  Kobayashi et al. ........... 348/557

FOREIGN PATENT DOCUMENTS

| | | |
|---|---|---|
| JP | 2008-54300 A | 3/2008 |
| JP | 2008-205562 A | 9/2008 |
| RU | 2004139118 A | 5/2005 |
| WO | WO 03/103223 A1 | 12/2003 |
| WO | WO-2007/074611 A1 | 7/2007 |

OTHER PUBLICATIONS

High-Definition Multimedia Interface Specification, Version 1.2a Supplement 1 Consumer Electronics Control(CEC), Dec. 14, 2005.

* cited by examiner

FIG. 4
(A)
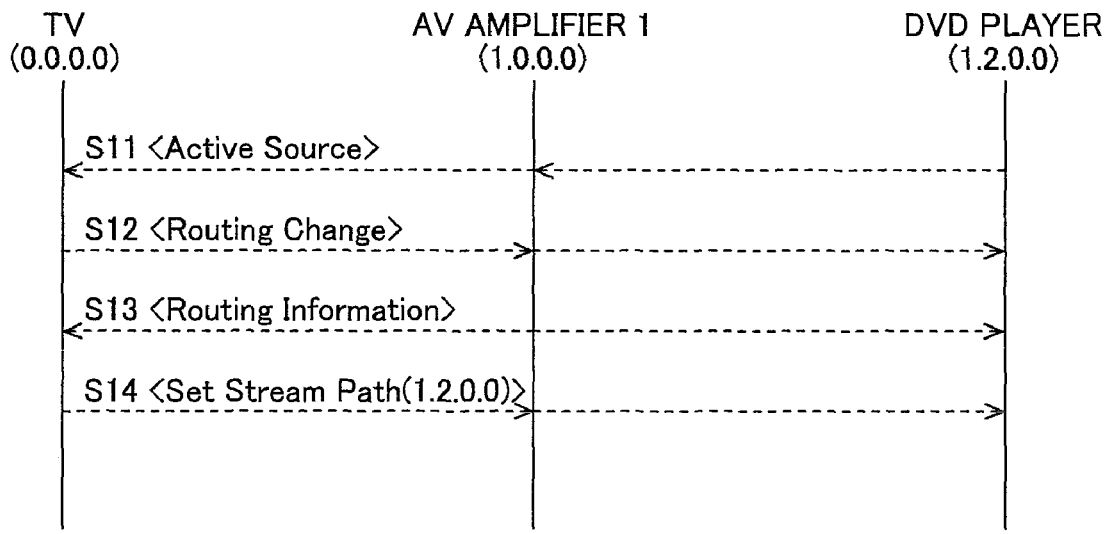
(B)
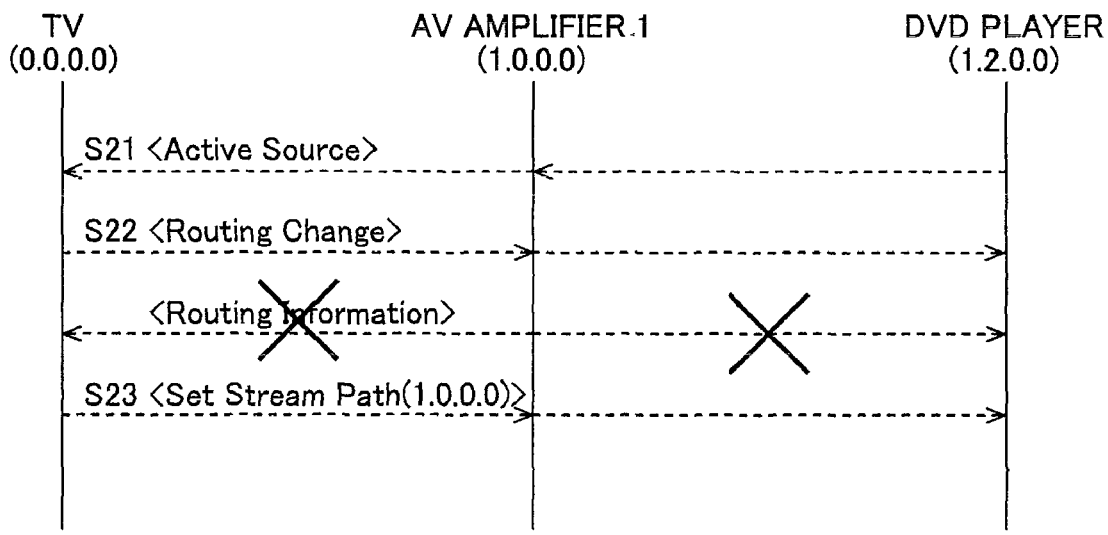

DISPLAY SYSTEM AND DISPLAY APPARATUS

TECHNICAL FIELD

The present invention relates to a display system and a display apparatus, more specifically, to a display system including a display apparatus capable of being connected to an output apparatus (external device) such as a DVD recording apparatus through a digital interface such as an HDMI (High Definition Multimedia Interface) and a display apparatus constituting the system.

BACKGROUND OF THE INVENTION

HDMIs have come into wide use as a digital interface for transmission of video/audio. The HDMI is arranged for AV devices by adding an audio transmission function and a copyright protection function to DVI which is a connection standard for a PC and a display.

Conventionally, a plurality of cables for each signal of video/audio/control have been used for the connection between devices, however, since the HDMI needs only one cable and control signals correspond to bidirectional transmission, it has also been possible to operate the entire AV system such as a home theater with one remote controller by relaying the control signal to an output apparatus such as an STB (Set Top Box) and a DVD player connected by the HDMI from a monitor.

The basic specification for the standard of the HDMI was established in December 2002 by the standardization organization of HDMI Licensing, LLC (HDMI standard Ver1.0), and a rule for CEC (Consumer Electronics Control) was added as a control protocol for performing control between AV devices in December 2005 (HDMI standard Ver1.2a, refer to Non-Patent Literature 1). After that, although some revisions have been made, description of the CEC will hereinafter be based on the standard after the HDMI standard Ver1.2a and be referred to as the HDMI standard unless otherwise noted.

Note that, terms about the CEC are defined in "2.2 Glossary of Terms" of the HDMI standard, "CEC 2.2 Glossary of Terms" and the like, where one that has an HDMI input terminal is defined as a sink device, one that has an HDMI output terminal and outputs an AV stream is defined as a source device, and one that has an HDMI input terminal and output terminal and inputs/outputs an AV stream is defined as a repeater device.

In the HDMI standard, control between devices using the CEC is defined. According to the CEC, various kinds of control are possible based on individual physical addresses and logical addresses assigned to each device existing on an HDMI network. For example, when reproduction of video is made by depressing a reproduction button, or the like, of a DVD player connected by HDMI while a user views digital broadcast on a television, the television automatically switches to an input connected with the DVD player. Moreover, operation menu displayed on the DVD player, on/off of a power source and the like is able to be operated from a remote controller of the television.

In addition, the HDMI standard prescribes that operation is able to be made even when a maximum of 10 devices including a television are connected, thus it is possible to connect up to nine external devices to a television. When one device compatible with HDMI CEC is connected to the television, it is clear which device is operated from a remote controller, however, when a plurality of devices compatible with HDMI CEC are connected, there is a problem that it is hard to recognize which device is operated from the television using a remote controller of the television.

Hence, it is considered that, when operating of the device compatible with HDMI CEC from the television using the remote controller of the television as described above, by selecting a device actually displaying video on the television as a device targeted for the operation, the operation object device is limited from a plurality of devices. In the HDMI standard, as a CEC message for clearly indicating such a device displaying video on the television, <Active Source> is prescribed. According to this prescription, for example, in a case where a user operates a reproduction button of a DVD player compliant with HDMI CEC, when the DVD player itself is in a state capable of outputting stable video signal (that is, in an active state), the DVD player outputs an AV stream as well as broadcasts <Active Source> indicative of being an active device. Here, the "broadcast" means simultaneous transmission of signal whose transmission destination is not a specific device but all devices. The television and other devices compatible with HDMI CEC to which <Active Source> has been broadcasted switch a route for reproducing the AV stream output from the DVD player. In this way, it is prescribed that in devices compatible with HDMI CEC a device displaying video on TV broadcasts <Active Source> to other devices in a network.

Note that, although an example in a case of operating a reproduction button of a DVD player has been described above, it is similar in the next case. For example, in a case where <Request Active Source> has been broadcasted by other device compatible with HDMI CEC due to a user operation, and when a DVD player is an "active device", the DVD player broadcasts <Active Source> indicative of itself being an active device. Here, the <Request Active Source> is one of CEC messages defined in the HDMI standard and used for a purpose to inquire about an active device in a route.

However, a method in which an "active device" which has broadcasted <Active Source> becomes as an operation object device has the following problem. To correspond to the CEC itself is optional in the HDMI standard, however, essentially corresponded prescriptions and selectively corresponded prescriptions are mixed in various prescriptions of the CEC, thus posing the following disadvantage.

Assumed is a state where a television includes a plurality of HDMI input terminals, and for example, a device A and a device B that are devices compatible with HDMI CEC are connected to each of the HDMI input terminals. First, it is assumed that a user operates a reproduction button of the device A intending to operate the device A connected to the television. In this case, since the device A is an operable device, the device A broadcasts <Active Source> as described above. That is, at this time, the television and other devices compatible with HDMI CEC having received this are notified that the device A is an "active device".

Next, it is assumed that the user performs input switching operation of the television intending to operate the device B and selects a connected input of the device B. However, there is a case where the device B does not broadcast <Active Source>, and in such a case, the device A remains as an "active device". Thus, even when the user performs some operation to the device B, operation signal thereof is transmitted to the device A which is the "active device". Such disadvantage is caused by that the device B does not correspond to a selectively-corresponded prescription in the HDMI standard.

Even after a user displays video to instruct switching to a device desired to be an operation object, when the switching destination device is not an "active device", the television does not recognize the device as an operation object device, thus it is impossible to operate the switching destination device from the television.

Contrary to this, even when a device is not an "active device", there is a method that the television recognizes the device as an operation object device. This method is, regardless of presence/absence of <Active Source>, one in which a device specified by <Set Stream Path> becomes as an operation object device. The <Set Stream Path> is one of CEC messages defined in the HDMI standard, and when an input switching operation is made by a user, transmitted from a television to switch an input path by broadcast.

[Non-Patent Literature 1] High-Definition Multimedia Interface Specification Version 1.2a Supplement 1 Consumer Electronics Control (CEC), Dec. 14, 2005

DISCLOSURE OF THE INVENTION

Problems to be Solved by the Invention

However, the above-described method in which the device specified by <Set Stream Path> becomes as an operation object device has the following problem.

For example, it is assumed that a television, a repeater device and a source device are connected in this order and the repeater device is a device non-compatible with CEC. In a case where video output operation is made to the source device or <Request Active Source> is broadcasted by other device compatible with HDMI CEC, the source device, when being an "active device" in itself, broadcasts <Active Source>. A television having received <Active Source> broadcasts <Set Stream Path> to switch an input path to the source device. At this time, since the repeater device which is a device non-compatible with CEC does not notify the television of a physical address of a source device connected to the repeater device itself, the television is able to recognize only up to the physical address of the repeater device. As a result, the television broadcasts <Set Stream Path> that specifies the physical address of the repeater device. Thereby, in the case of making the device specified by <Set Stream Path> become as an operation object device, the repeater device which is a device non-compatible with CEC is to be recognized as the operation object device.

The present invention has been made in view of the above-mentioned circumstances, and an object is to provide a display system capable of, in a case where a plurality of external devices are HDMI-connected to a display apparatus hierarchically and a device non-compatible with CEC is contained in an input path, selecting an external device that has transmitted <Active Source> as the operation object device without selecting an operation object device by <Set Stream Path> and a display apparatus constituting the system.

Means for Solving the Problems

In order to solve the above problem, a first technical means of the present invention is a display system wherein a display apparatus and a plurality of external devices are HDMI-connected hierarchically in a tree shape, wherein the display apparatus is provided with a CEC interface which receives a first CEC message indicative of being in an active state capable of outputting video, from any of external device out of the plurality of external devices, and which transmits a second CEC message to switch an input path to the external device, and operation object device selection portion for selecting, when a device non-compatible with CEC is contained in the input path for transmitting the second CEC message, an external device that corresponds to a physical address specified by the first CEC message as an operation object device.

A second technical means is the display system as defined in the first technical means, wherein the operation object device selection portion compares a first physical address contained in the first CEC message received from the external device, with a second physical address contained in the second CEC message transmitted from the display apparatus, and when an input path shown by the second physical address is contained in an input path shown by the first physical address, an external device that corresponds to a physical address specified by the first CEC message is selected as an operation object device.

A third technical means is the display system as defined in the first technical means, wherein the operation object device selection portion selects an external device specified by the second CEC message as an operation object device when a device non-compatible with CEC is not contained in the input path for transmitting the second CEC message.

A fourth technical means is the display system as defined in any one of the first through the third technical means, wherein the first CEC message is <Active Source> defined in HDMI standard, and the second CEC message is <Set Stream Path> defined in the HDMI standard.

A fifth technical means is the display apparatus constitutes the display system as defined in any one of the first through the third technical means.

Effect of the Invention

According to the present invention, in a case where a plurality of external devices are HDMI-connected to a display apparatus hierarchically and when a device non-compatible with CEC is contained in an input path, without selecting an operation object device by <Set Stream Path>, selecting an external device that has transmitted <Active Source> as the operation object device is possible, and thereby a user may operate the connected external device smoothly without particular consciousness about device compatible/non-compatible with HDMI CEC.

BRIEF DESCRIPTION OF DRAWINGS

FIG. 4 is a view showing an example of communication processing by CEC when input switching is performed by video output from a source device.

EXPLANATION OF REFERENCE NUMERALS

10 . . . source device, 10*a*, 10*c* . . . recorder, 10*b* . . . DVD player, 11 . . . HDMI transmitter, 12 . . . HOST CPU, 13 . . . front microcomputer, 14 . . . CEC I/F, 20 . . . repeater device, 20*a* . . . AV amplifier, 21 . . . HDMI receiver, 22 . . . HDMI transmitter, 23 . . . HOST CPU, 24, 32 . . . front microcomputer, 25 . . . CEC I/F, 30 . . . sink device, 31 . . . HOST CPU, 33 . . . CEC I/F, 34 . . . memory, 35 . . . light receiving portion, 36 . . . remote controller, 41 . . . TMDS line, 42 . . . CEC line, 100 . . . television apparatus, 101 . . . TV tuner, 102 . . . demultiplexer, 103 . . . decoder, 104 . . . system control portion, 104a . . . operation object device selection portion, 105 . . . bus arbitration portion, 106, 107 . . . external input terminal, 108, 109 . . . HDMI terminal, 110 . . . image processing portion, 111 . . . device driving portion, 112 . . . frame memory, 113 . . . display apparatus, 114 . . . infrared ray receiving portion, 115 . . . memory, 116 . . . audio processing portion, 117 . . . speaker

PREFERRED EMBODIMENT OF THE INVENTION

Preferred embodiments according to a display system and a display apparatus constituting the system of the present invention will hereinafter be described with reference to the accompanying drawings.

In the embodiments of the present invention, a CEC message included in the HDMI standard is used. The CEC message is device control signal standardized by the HDMI.

Figure 1:
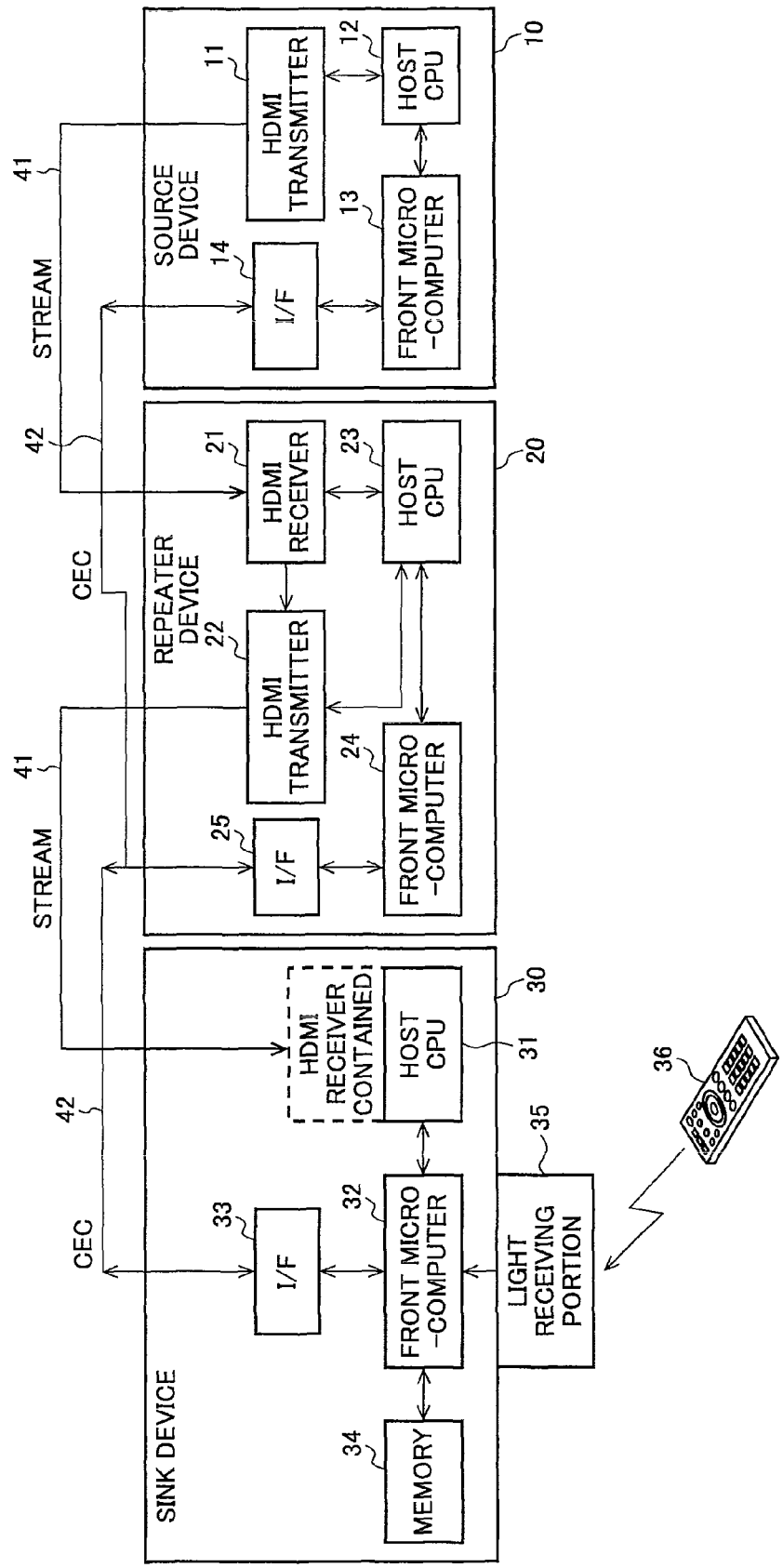
FIG. 1 is a block diagram illustrating a structural example of important parts according to HDMI connection in a display system of the present invention.

FIG. 1 is a block diagram illustrating a structural example of important parts according to HDMI connection in the display system of the present invention, which shows the structure in which a source device 10, a repeater device 20 and a sink device 30 are connected through an HDMI cable. Note that, the source device 10 is, for example, such as a DVD recorder, an HDD recorder, a DVD player, a digital system VTR, and a digital video camera, each of which has an HDMI output terminal. The repeater device 20 such as an AV amplifier, a recorder, and a player, each of which has HDMI input terminal and output terminal. The sink device 30 is a display apparatus including a liquid crystal television and a monitor, each of which has an HDMI input terminal. When the repeater device 20 such as an AV amplifier has a plurality of HDMI input terminals, a plurality of the source devices 10 can be connected to the repeater device 20 and an input line can be switched using a selector function of the AV amplifier.

The sink device 30 according to the present invention detects operation states of the repeater device 20 and the source device 10, and uses a CEC message transferred through a CEC line 42 to control the operation states of the repeater device 20 and the source device 10. As has been described above, the CEC message is device control signal based on a CEC protocol of the HDMI standard. In addition, by exchanging the device control signal between devices, various operation controls are realized between the sink device 30 and a connected device.

Note that, the HDMI cable includes a TMDS (Transition Minimized Differential Signaling) line (digital signal line) 41 for transmitting video/audio signal as digital signal in a differential method and the CEC line 42 which is a bidirectional bus for transmitting common control signal (CEC message) between devices. In addition, the HDMI cable includes a DDC (Display Data Channel) line (not shown) which is used for transmission of EDID (Extended Display Identification Data), authentication of HDCP (High-bandwidth Digital Content Protection system) and the like.

Description will hereinafter be given for a structure of important parts according to HDMI connection of the source device 10, the repeater device 20, and the sink device 30.

The source device 10 includes an HDMI transmitter 11, a HOST CPU 12, a front microcomputer 13, and a CEC interface (hereinafter, CEC I/F) 14. The HDMI transmitter 11 reads video data and audio data recorded on a medium such as a DVD, for example, to convert into an AV stream in an HDMI format, in which audio signal is inserted in a blanking period of video signal. Then, the converted AV stream is transferred to the repeater device 20 through the TMDS line 41 by the HDMI transmitter 11. The HOST CPU 12 includes an HDMI controller for controlling operation of the HDMI transmitter 11.

The CEC I/F 14 is connected to the CEC line 42 in the HDMI cable and allows bidirectional communication of a CEC message with the repeater device 20. The CEC I/F 14 is controlled by the front microcomputer 13 including a CEC controller so that HDMI-connected devices can be controlled using the CEC message. In the case of the CEC, logical address (type of device) and physical address (position of device) of each HDMI-connected device are obtained, and therefore it is possible to transmit the CEC message to a desired device by specifying the physical address.

The HOST CPU 12 controls the entire apparatus. Moreover, the front microcomputer 13 operates with low electric power and always monitors a CEC message transferred from the CEC line 42. In addition, when there is a remote controller, the presence/absence of transmission of remote controller signal thereof is monitored. Moreover, even when the power source of the HOST CPU 12 is cut because of a stand-by mode of the apparatus and the like, the front microcomputer 13 operates (operates in a state capable of at least transferring a CEC message).

The repeater device 20 includes an HDMI receiver 21, an HDMI transmitter 22, a HOST CPU 23, a front microcomputer 24, and a CEC I/F 25. The repeater device 20 receives an AV stream transferred from the source device 10 at the HDMI receiver 21 and further transmits the AV stream to the sink device 30 from the HDMI transmitter 22. In addition, the CEC line 42 between the repeater device 20 and the source device 10 and the CEC line 42 between the repeater device 20 and the sink device 30 are connected by the CEC I/F 25.

The HOST CPU 23 and the front microcomputer 24 have the similar function to that of the above-mentioned source device 10, and the HOST CPU 23 controls the HDMI receiver 21 and the HDMI transmitter 22 as well as controls the entire apparatus. In addition, the front microcomputer 24 includes a CEC controller for monitoring a CEC message transferred from the CEC line 42.

The sink device 30 includes a HOST CPU 31 containing an HDMI receiver, a front microcomputer 32, a CEC I/F 33, a memory 34, and a light receiving portion 35. The sink device 30 receives the AV stream transferred by the repeater device 20 at the HOST CPU 31 containing the HDMI receiver. The HDMI receiver may be separated from the HOST CPU 31. In addition, with the CEC I/F 33, the CEC line 42 between the sink device 30 and the repeater device 20 is connected. A control program of the sink device 30 and the like are stored in the memory 34. In addition, the memory 34 stores physical addresses of the repeater device 20 and the source device 10 that are HDMI-connected to the sink device 30 based on the HDMI standard.

The HOST CPU 31 contains the HDMI receiver and controls the entire apparatus. Moreover, the front microcomputer 32 includes a CEC controller for monitoring a CEC message transferred from the CEC line 42. The front microcomputer 32 controls the light receiving portion 35 for receiving remote controller signal from the remote controller 36. In addition, even when the power source of the HOST CPU 31 is cut because of a stand-by mode of the apparatus and the like, the front microcomputer 32 operates to maintain a state capable of transmitting/receiving a CEC message and receiving remote controller signal.

Figure 2:
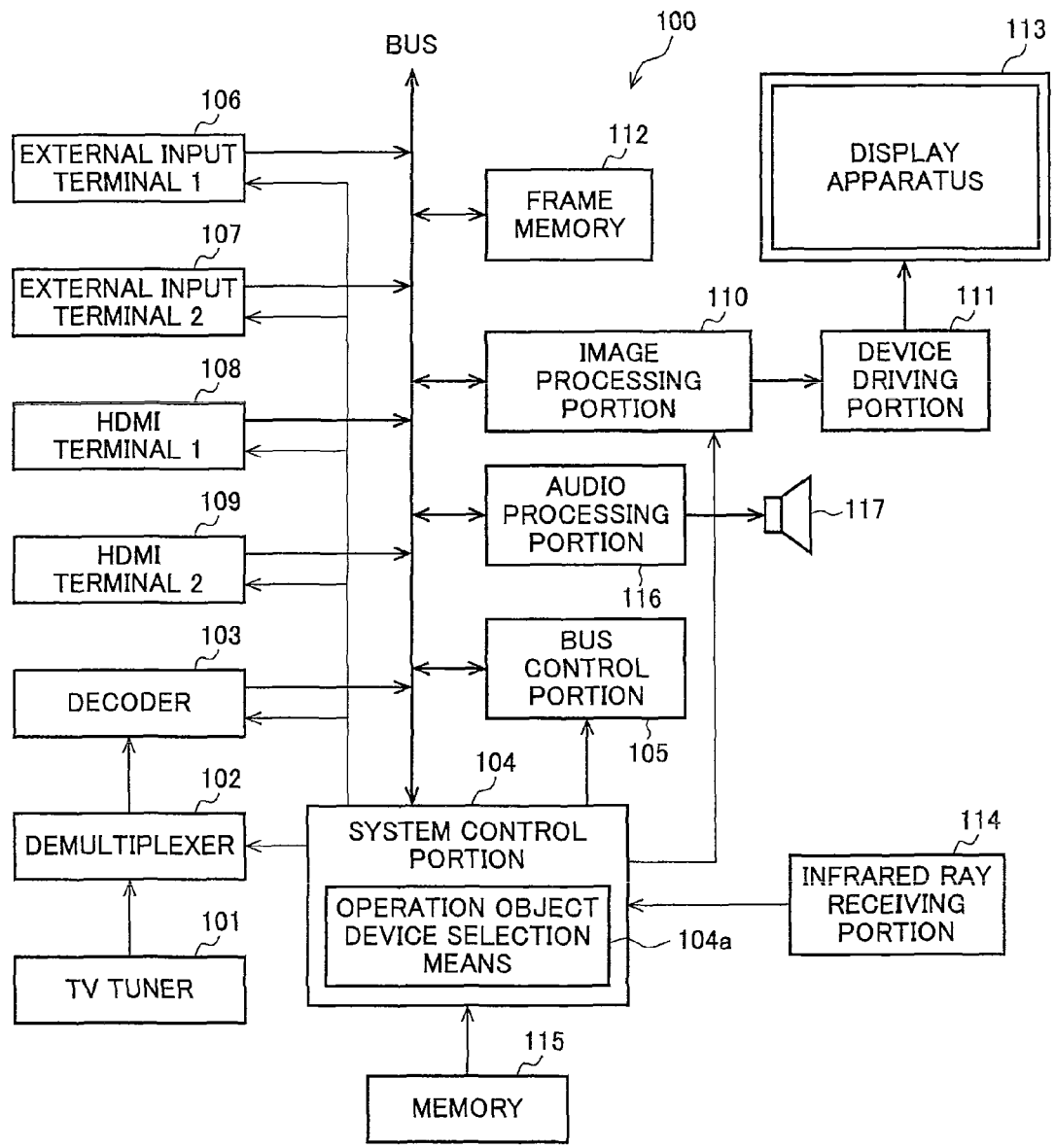
FIG. 2 is a block diagram showing a structural example of a display apparatus according to an embodiment of the present invention.

FIG. 2 is a block diagram showing a structural example of the display apparatus according to an embodiment of the present invention, and shows an example where the display apparatus of the present invention is applied to a television apparatus. In the figure, 100 denotes a television apparatus which has an HDMI CEC function similar to that of the sink device 30 shown in FIG. 1.

The television apparatus 100 includes a TV tuner 101 for selecting and demodulating television broadcast signal, a demultiplexer 102 for extracting EPG (registered trademark) data from demodulated broadcast signal and separating the demodulated data, and a decoder 103 for decoding separated video signals and audio signals of digital broadcast.

Moreover, the television apparatus 100 has a system control portion 104 for performing control of the entire system, and a bus control portion 105 for granting permission of using a bus in response to a request of using bus from the system control portion 104. When there is a request of using bus at one time, the bus control portion 105 promptly grants permission to use the bus, and when there are a plurality of requests at one time, that is, when requests of using bus compete with each other, permission of using bus is granted according to priority previously determined by the system control portion 104 and the like.

The television apparatus 100 is provided with two external input terminals 106 and 107 (external input terminals 1 and 2), and two HDMI terminals 108 and 109 (HDMI terminals 1 and 2). An input switching menu is prepared in order to switch the external input terminals 106 and 107 and the HDMI terminals 108 and 109, and is held in a memory 115. The memory 115 is a nonvolatile memory or the like, and stores a control program for operating the television apparatus 100 and various kinds of data. The external input terminals 106 and 107 are terminals for external input except for HDMI input, and are interfaces of, for example, such as a video input terminal, IEEE 1394, and USB (registered trademark). The HDMI terminals 108 and 109, including CEC I/F shown in FIG. 1, connect a plurality of external devices through an HDMI cable for transmitting/receiving a CEC message between external devices by a CEC line as well as receiving video signal (including audio signal) from external devices by a TMDS line.

In an image processing portion 110, video signal converting processing such as noise reduction, scaling, and IP conversion, is appropriately performed as the occasion demands. In addition, image quality adjustment such as image quality emphasis correcting processing and γ correcting processing is appropriately performed. Moreover, in image signal converting processing, a frame memory 112 is used to perform various kinds of three-dimensional image processing. A device driving portion 111 controls driving of a display apparatus 113 such as a liquid crystal panel to cause the display apparatus 113 to display video signals output from the image processing portion 110. In addition, the television apparatus 100 is provided with an infrared ray receiving portion 114 for receiving infrared ray signal from a remote controller (not shown) operated by a user.

Further, audio signal decoded by the decoder 103 is processed at an audio processing portion 116 and this audio signal is supplied to a speaker 117 to reproduce sound.

The system control portion 104 includes the front microcomputer shown in FIG. 1 and the like, and controls input switching of the TV tuner 101, the external input terminals 106 and 107, and the HDMI terminals 108 and 109. In addition, the system control portion 104 performs analysis of a CEC message transmitted/received through the HDMI terminals 108 and 109 and control of operations based on the analysis result.

A main characteristic part of the present invention lies in that, in a case where a plurality of external devices are connected to the television apparatus 100 through the HDMI terminals 108 and 109 hierarchically in a tree shape and a device non-compatible with CEC is contained in an input path, selecting an external device that has transmitted <Active Source> as an operation object device is performed without selecting an operation object device by <Set Stream Path>. As the structure for this, the television apparatus 100 includes the HDMI terminals (CEC I/F) 108 and 109 which receive <Active Source> corresponding to the first CEC message indicative of being in an active state and output from any external device out of a plurality of external devices, and transmit <Set Stream Path> corresponding to the second CEC message for switching an input path to the external device. The <Active Source> is transmitted from an external device that has become an "active device" as video output operation was made by a user, or an external device which has been an "active device" when <Request Active Source> was broadcasted from other device compatible with HDMI CEC by a user operation.

Furthermore, the television apparatus 100 includes, when a device non-compatible with CEC is contained in an input path for transmitting <Set Stream Path>, operation object device selection portion 104a for selecting an external device specified by <Active Source> as an operation object device. The operation object device selection portion 104a selects, when a CEC non-corresponding apparatus is not contained in the input path for transmitting <Set Stream Path>, an external device specified by <Set Stream Path> as the operation object device. The function of the operation object device selection portion 104a is executed by the system control portion 104.

Description will be given for a method for selecting an operation object device by a display system of the present invention with reference to FIGS. 3 and 4 below illustrating a specific example.

Figure 3:
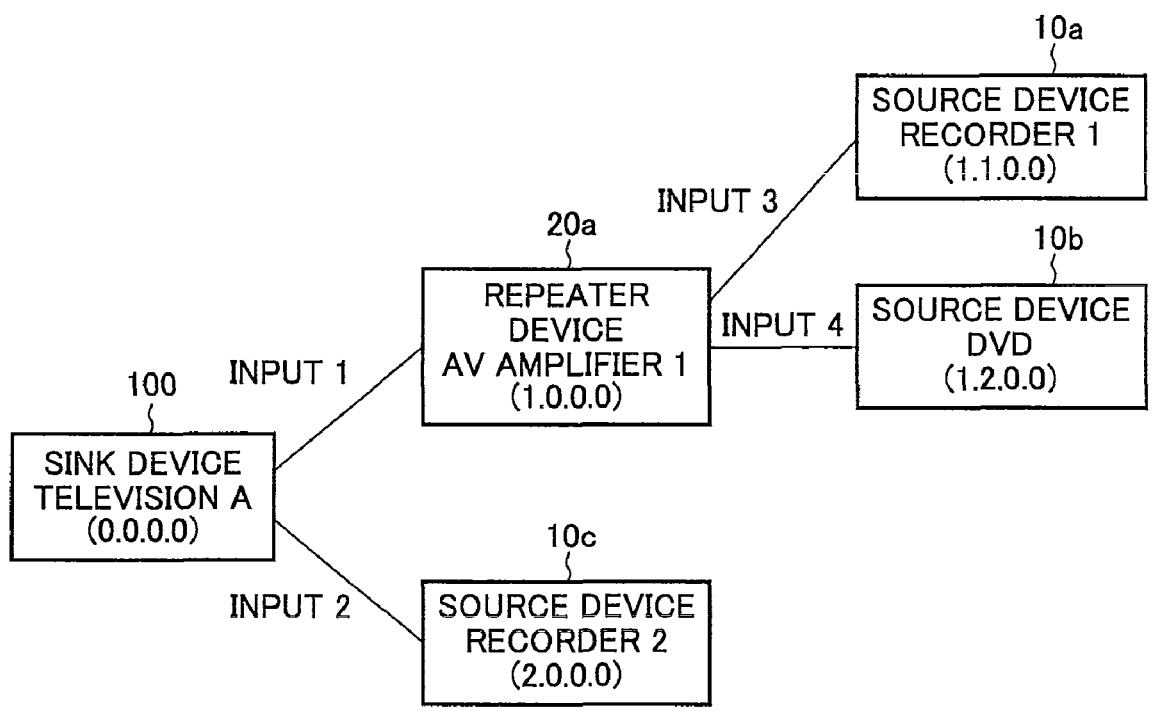
FIG. 3 is a view illustrating an example of a method for selecting an operation object device by the display system of the present invention.

FIG. 3 is a view illustrating an example of a method for selecting an operation object device by the display system of the present invention. In this example, the television apparatus (hereinafter, TV) 100 as a sink device includes two HDMI inputs (input 1 and input 2), wherein one input 1 is connected to an AV amplifier 20a as a repeater device, and further the AV amplifier 20a includes two HDMI inputs (input 3 and input 4), wherein the input 3 is connected to a recorder 10a as a source device and the input 4 is connected to a DVD player 10b as a source device. Additionally, the other input 2 is connected to a recorder 10c as a source device. Note that, numbers of (0.0.0.0), (1.0.0.0), ..., (2.0.0.0) assigned to each device are physical addresses showing connected positions of each device.

FIG. 4 is a view showing an example of communication processing by CEC when input switching is performed by video output from a source device. FIG. 4(A) shows an example of a case where the AV amplifier 20a as the repeater device is a device compatible with HDMI CEC, and FIG. 4(B) shows an example of a case where the AV amplifier 20a as the repeater device is a device non-compatible with CEC. Note that, description for the communication processing in FIGS. 4(A) and (B) will be given based on the connection example of FIG. 3, and a command transmission illustrated by a dotted line shows processing of transmitting from a transmission source by broadcast.

In FIG. 4(A), when a reproduction button of a DVD player 10b at physical address (1.2.0.0) is pressed and reproduction of AV stream is started during the viewing video recorded in a recorder 10c on TV 100, the DVD player 10b transmits <Active Source> indicative of itself being an "active device"

by broadcast (S11). On receipt of this, TV 100 transmits a CEC message <Routing Change> indicative of switching an input path to HDMI input (input 1) to which the AV amplifier 20a is connected, by broadcast (S12). Then, on receipt of this, the AV amplifier 20a transmits, as the DVD player 10b is connected thereto, a CEC message <Routing Information> to notify of an input path from the AV amplifier 20a to the DVD player 10b by broadcast (S13). Finally, the TV 100 having received this transmits a CEC message <Set Stream Path (1.2.0.0)> to determine the input path to the DVD player 10b by broadcast (S14).

At the physical address (1.2.0.0) specified by the finally transmitted <Set Stream Path>, the DVD player 10b exists. Accordingly, an operation object device in this case is the DVD player 10b. Note that, in this case, the physical address (1.2.0.0) is the second physical address.

Hereinbefore, description has been given illustrating a case where the reproduction button of the DVD player 10b was pressed, however, it is also similar in a case where <Request Active Source> is broadcasted from other device compatible with HDMI CEC due to a user operation, and a DVD player 10b broadcasts <Active Source> indicative of itself being an "active device".

Here, both the <Routing Change> and <Routing Information> are CEC messages defined in the HDMI standard. The <Routing Change> is for showing a change of the input path, and the <Routing Information> is for notifying of the input path on receipt of the <Routing Change>.

According to the example of FIG. 4(A), in response to the video output operation for the source device, <Active Source> is transmitted from the source device. The TV on receipt of this transmits <Set Stream Path> by broadcast specifying a physical address of the source device. As a result, the source device specified by <Set Stream Path> may become as an operation object device. In this case, the AV amplifier 20a as the repeater device needs to be a device compatible with HDMI CEC.

However, when the AV amplifier 20a is a device non-compatible with CEC, because of not reacting to <Routing Change> broadcast-transmitted by the TV 100, the CEC message <Routing Information> to notify of the input path from the AV amplifier 20a to the DVD player 10b is not transmitted. Thereby, <Set Stream Path> finally transmitted by the TV 100 is to be <Set Stream Path (1.0.0.0)> which input path has been confirmed. Accordingly, the AV amplifier 20a is selected as an operation object, and the DVD player 10b is not able to become as an operation object. Description for this will be given based on FIG. 4(B).

In FIG. 4(B), when a reproduction button of a DVD player 10b at physical address (1.2.0.0) is pressed and reproduction of AV stream is started during the viewing video recorded in a recorder 10c on TV 100, the DVD player 10b transmits <Active Source> indicative of itself being an "active device" by broadcast (S21). On receipt of this, TV 100 transmits a CEC message <Routing Change> indicative of switching an input to HDMI input (input 1) to which an AV amplifier 20a is connected, by broadcast (S22). However, since the AV amplifier 20a is a device non-compatible with CEC that does not respond to a CEC message, a CEC message <Routing Information> to notify of a route from the AV amplifier 20a to the DVD player 10b is not transmitted.

Then, the TV 100 which is not able to receive <Routing Information>, is unable to determine an input path from and after the AV amplifier 20a, and transmits a CEC message <Set Stream Path (1.0.0.0)> to determine a finally confirmed input path up to the AV amplifier 20a by broadcast (S23).

As a result, at a physical address specified by <Set Stream Path> finally transmitted, the AV amplifier 20a exists, and the AV amplifier 20a that is a device non-compatible with CEC becomes an operation object device.

To improve such a problem, processing described below is executed in the present invention.

The TV 100 recognizes that the "active device" is the DVD player 10b at the time <Active Source> has been transmitted (S21). Therefore, the TV 100 updates, at the time of receiving the <Active Source>, an operation object device (that is, updates to the DVD player 10b) with the physical address (first physical address) notified by the <Active Source>. Furthermore, in route switching processing on receipt of <Active Source>, as long as the physical address (second physical address) specified by <Set Stream Path> transmitted in the processing is a device non-compatible with CEC, an operation object device is not to be updated by the physical address (second physical address) of the device non-compatible with CEC. Thereby, in the case of the example of FIG. 3, the AV amplifier 20a that does not correspond to CEC is not selected as an operation object, and the DVD player 10b specified by <Active Source> is selected as an operation object device.

Note that, the above-described processing is executed only in a case where the AV amplifier 20a is the device non-compatible with CEC, and when the AV amplifier 20a is the device compatible with HDMI CEC, as shown in FIG. 4(A), an operation object device is updated by the physical address specified by the <Set Stream Path>.

Update processing of an operation object device when the AV amplifier 20a does not correspond to CEC, or corresponds to CEC, is executed by operation object device selection portion 104a shown in FIG. 2. The operation object device selection portion 104a is able to determine whether AV amplifier 20a is device compatible with HDMI CEC or non-corresponding device by presence/absence of a response to a CEC message <Routing Change>.

Here, a physical address of the AV amplifier 20a is (1.0.0.0) and a physical address of the DVD player 10b is (1.2.0.0), therefore it is understood that an input path up to the physical address (1.0.0.0) of the AV amplifier 20a is contained in an input path up to the physical address (1.2.0.0) of the DVD player 10b. Nonetheless, since there is no response to a CEC message from the AV amplifier 20a at the physical address (1.0.0.0), it is recognized that it is a device non-compatible with CEC. In the case of the device non-compatible with CEC, because of not responding to a CEC message, the physical address (1.0.0.0) of the AV amplifier 20a is not appropriate as a physical address of an operation object device. Thereby, an operation object device is not updated by the physical address (1.0.0.0) of the AV amplifier 20a, and the DVD player 10b at the physical address (1.2.0.0) specified by <Active Source> that has already been received, becomes as an operation object device. Note that, in this case, the physical address (1.2.0.0) is the first physical address.

That is, the operation object device selection portion 104a shown in FIG. 2 compares the first physical address (1.2.0.0) included in the <Active Source> received from the DVD player 10b, with the second physical address (1.0.0.0) included in the <Set Stream Path> transmitted from the TV 100, and when an input path shown by the second physical address (1.0.0.0) is contained in an input path shown by the first physical address (1.2.0.0), the DVD player 10b specified by <Active Source> is selected as an operation object device.

By performing the above-described processing, in a network structure to which a plurality of devices are HDMI-connected, even when a CEC non-corresponding repeater device exists between a sink device (TV) and a source device, the source device notifies TV of <Active Source> by performing video output operation to a source device and, thereby, the source device that has notified of the <Active Source> is able to become as an operation object.

The invention claimed is:

1. A display system wherein a display apparatus and a plurality of external devices are HDMI-connected hierarchically in a tree shape, wherein the display apparatus is provided with a CEC interface which receives a first CEC message indicative of being in an active state capable of outputting video, from any of external device out of the plurality of external devices, and which transmits a second CEC message to switch an input path to the external device, and operation object device selection portion for selecting, when a device non-compatible with CEC is contained in the input path for transmitting the second CEC message, an external device that corresponds to a physical address specified by the first CEC message as an operation object device.

2. The display system as defined in claim 1, wherein the operation object device selection portion compares a first physical address contained in the first CEC message received from the external device, with a second physical address contained in the second CEC message transmitted from the display apparatus, and when an input path shown by the second physical address is contained in an input path shown by the first physical address, an external device that corresponds to a physical address specified by the first CEC message is selected as an operation object device.

3. The display system as defined in claim 1, wherein the operation object device selection portion selects, an external device specified by the second CEC message as an operation object device when a device non-compatible with CEC is not contained in the input path for transmitting the second CEC message.

4. The display system as defined in any one of claims 1 through 3, wherein the first CEC message is <Active Source> defined in HDMI standard, and the second CEC message is <Set Stream Path> defined in the HDMI standard.

5. A display apparatus that constitutes the display system defined in any one of claims 1 through 3.

* * * * *